US007941707B2

(12) United States Patent
Sarig et al.

(10) Patent No.: US 7,941,707 B2
(45) Date of Patent: May 10, 2011

(54) GATHERING INFORMATION FOR USE IN DIAGNOSTIC DATA DUMPING UPON FAILURE OCCURRENCE

(75) Inventors: Yair Sarig, San Mateo, CA (US); Benoit Dageville, Foster City, CA (US); Marcus Fallen, Belmont, CA (US); Ajith Kumar Mysorenagarajarao, San Mateo, CA (US); Mark Ramacher, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 270 days.

(21) Appl. No.: 12/251,671

(22) Filed: Oct. 15, 2008

(65) Prior Publication Data

US 2009/0106595 A1 Apr. 23, 2009

Related U.S. Application Data

(60) Provisional application No. 60/981,456, filed on Oct. 19, 2007.

(51) Int. Cl.
*G06F 11/00* (2006.01)

(52) U.S. Cl. ........................................................ 714/47

(58) Field of Classification Search ............... 714/15–18, 714/20, 21, 25–27, 37–39, 45–48, 57
See application file for complete search history.

(56) References Cited

U.S. PATENT DOCUMENTS

| | | | |
|---|---|---|---|
| 4,866,635 A | 9/1989 | Kahn et al. | |
| 5,067,099 A | 11/1991 | McCown et al. | |
| 5,123,017 A | 6/1992 | Simpkins et al. | |
| 5,845,272 A | 12/1998 | Morjaria et al. | |
| 5,922,079 A | 7/1999 | Booth et al. | |
| 5,968,122 A | 10/1999 | Schlosser et al. | |
| 6,012,152 A | 1/2000 | Douik et al. | |
| 6,125,311 A | 9/2000 | Lo | |
| 6,182,249 B1 * | 1/2001 | Wookey et al. | 714/47 |
| 6,208,955 B1 | 3/2001 | Provan et al. | |
| 6,237,114 B1 * | 5/2001 | Wookey et al. | 714/47 |
| 6,243,628 B1 | 6/2001 | Bliley et al. | |
| 6,434,512 B1 | 8/2002 | Discenzo | |

(Continued)

FOREIGN PATENT DOCUMENTS

EP 633536 A1 1/1995

OTHER PUBLICATIONS

U.S. Appl. No. 12/251,667, filed Oct. 15, 2008, Sarig et al.

(Continued)

*Primary Examiner* — Nadeem Iqbal
(74) *Attorney, Agent, or Firm* — Kilpatrick Townsend & Stockton LLP

(57) ABSTRACT

Techniques for gathering information during runtime of a monitored system such that the information is available for facilitating diagnostics for the monitored system. In one embodiment, upon detection of a condition (such as an error condition) in the monitored system, a portion of the gathered information provides contextual information that facilitates gathering of diagnostic data that is relevant for the detected condition. This facilitates capturing of diagnostic data that is relevant for diagnosing the detected condition. The information gathered and stored during runtime may include information related to local variables, information related to tagged information (e.g., tagged functions/processes) executing in the monitored system, information related to potential impacts to the monitored system due to failures, metadata information, and other information.

20 Claims, 5 Drawing Sheets

U.S. PATENT DOCUMENTS

| | | |
|---|---|---|
| 6,519,552 B1 | 2/2003 | Sampath et al. |
| 6,535,865 B1 | 3/2003 | Skaaning et al. |
| 6,539,337 B1 | 3/2003 | Provan et al. |
| 6,604,141 B1 | 8/2003 | Ventura |
| 6,665,425 B1 | 12/2003 | Sampath et al. |
| 6,681,215 B2 | 1/2004 | Jammu |
| 6,697,810 B2 | 2/2004 | Kumar et al. |
| 6,697,962 B1 | 2/2004 | McCrory et al. |
| 6,738,811 B1 | 5/2004 | Liang |
| 6,782,345 B1 | 8/2004 | Siegel et al. |
| 6,862,698 B1 | 3/2005 | Shyu |
| 6,892,317 B1 | 5/2005 | Sampath et al. |
| 6,910,000 B1 | 6/2005 | Yedidia et al. |
| 6,915,128 B1 | 7/2005 | Oh |
| 6,944,800 B2 | 9/2005 | Brundridge et al. |
| 6,983,200 B2* | 1/2006 | Bodin et al. ............. 701/33 |
| 6,985,901 B1* | 1/2006 | Sachse et al. ............. 1/1 |
| 7,079,010 B2 | 7/2006 | Champlin |
| 7,100,083 B2 | 8/2006 | Little et al. |
| 7,113,988 B2 | 9/2006 | Chirashnya et al. |
| 7,124,328 B2 | 10/2006 | Bowers et al. |
| 7,191,364 B2 | 3/2007 | Hudson et al. |
| 7,257,744 B2 | 8/2007 | Sabet et al. |
| 7,281,040 B1 | 10/2007 | Ly |
| 7,281,170 B2 | 10/2007 | Taylor et al. |
| 7,308,385 B2 | 12/2007 | Wegerich et al. |
| 7,313,735 B1 | 12/2007 | Levergood et al. |
| 7,328,376 B2 | 2/2008 | McGuire et al. |
| 7,525,910 B2* | 4/2009 | Wen ............. 370/230 |
| 7,546,222 B2 | 6/2009 | Chintalapti et al. |
| 7,577,872 B2 | 8/2009 | DiBartolomeo et al. |
| 7,668,953 B1 | 2/2010 | Sinclair et al. |
| 7,681,086 B2 | 3/2010 | Vlassova et al. |
| 7,802,144 B2 | 9/2010 | Vinberg et al. |
| 2003/0033559 A1 | 2/2003 | Williams |
| 2003/0074607 A1 | 4/2003 | Brundridge et al. |
| 2004/0078683 A1 | 4/2004 | Buia et al. |
| 2004/0078695 A1 | 4/2004 | Bowers et al. |
| 2004/0078727 A1 | 4/2004 | Little et al. |
| 2004/0153429 A1 | 8/2004 | Horn et al. |
| 2004/0193956 A1 | 9/2004 | Greenlee et al. |
| 2005/0102567 A1 | 5/2005 | McGuire et al. |
| 2005/0120273 A1 | 6/2005 | Hudson et al. |
| 2005/0210331 A1 | 9/2005 | Connelly et al. |
| 2005/0228880 A1 | 10/2005 | Champlin |
| 2006/0256727 A1 | 11/2006 | Acharya et al. |
| 2007/0021966 A1 | 1/2007 | Ellefson et al. |
| 2007/0283329 A1 | 12/2007 | Caprihan et al. |
| 2008/0065706 A1* | 3/2008 | Miller et al. ............. 707/205 |
| 2008/0109796 A1 | 5/2008 | Kosche ............. 717/158 |
| 2008/0125877 A1* | 5/2008 | Miller et al. ............. 700/29 |
| 2008/0133978 A1 | 6/2008 | Angamuthu et al. |
| 2008/0141072 A1 | 6/2008 | Kalgren et al. |
| 2008/0189488 A1* | 8/2008 | DeWitt et al. ............. 711/132 |
| 2008/0208784 A1 | 8/2008 | Hill et al. |
| 2008/0208787 A1 | 8/2008 | Luchene |
| 2008/0297375 A1 | 12/2008 | Khuzadi |
| 2009/0083576 A1 | 3/2009 | Vlassova et al. |
| 2009/0105982 A1 | 4/2009 | Sarig et al. |
| 2009/0105989 A1 | 4/2009 | Ramacher et al. |
| 2009/0105991 A1 | 4/2009 | Ramacher et al. |
| 2009/0106180 A1 | 4/2009 | Kuchibhotla et al. |
| 2009/0106262 A1 | 4/2009 | Fallen et al. |
| 2009/0106278 A1 | 4/2009 | Ramacher et al. |
| 2009/0106363 A1 | 4/2009 | Fallen et al. |
| 2009/0106589 A1 | 4/2009 | Ramacher et al. |
| 2009/0106596 A1 | 4/2009 | Fallen et al. |
| 2009/0106601 A1 | 4/2009 | Ngai et al. |
| 2009/0106605 A1 | 4/2009 | Kuchibhotla et al. |
| 2009/0327815 A1 | 12/2009 | Sridharan et al. |
| 2010/0257410 A1 | 10/2010 | Cottrell et al. |

OTHER PUBLICATIONS

U.S. Appl. No. 12/251,711, filed Oct. 15, 2008, Ramacher et al.
U.S. Appl. No. 12/251,648, filed Oct. 15, 2008, Ramacher et al.
U.S. Appl. No. 12/252,070, filed Oct. 15, 2008, Kuchibhotla et al.
U.S. Appl. No. 12/251,685, filed Oct. 15, 2008, Fallen et al.
U.S. Appl. No. 12/252,056, filed Oct. 15, 2008, Ramacher et al.
U.S. Appl. No. 12/251,700, filed Oct. 15, 2008, Fallen et al.
U.S. Appl. No. 12/251,731, filed Oct. 15, 2008, Ramacher et al.
U.S. Appl. No. 12/251,743, filed Oct. 15, 2008, Fallen et al.
U.S. Appl. No. 12/251,661, filed Oct. 15, 2008, Ngai et al.
U.S. Appl. No. 12/252,128, filed Oct. 15, 2008, Kuchibhotla et al.
U.S. Appl. No. 12/485,759, filed Jun. 16, 2009, Beg et al.
U.S. Appl. No. 12/485,763, filed Jun. 16, 2009, Beg et al.
U.S. Appl. No. 12/485,766, filed Jun. 16, 2009, Beg et al.
U.S. Appl. No. 12/641,038, filed Dec. 17, 2009, Beg et al.
Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].
Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.
Haicheng, W., et al., "Research on the Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.
Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].
Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].
Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.
Morjaria, M., et al., "Monitoring Complex Systems with Causal Networks," IEEE Computational Science & Engineering, vol. 3, Issue 4, Winter 1996, pp. 9-10.
Nielsen, U. H., et al., "Explanation Trees for Causal Bayesian Networks," 8 pages. [Can also be found in Proceedings of the 24th Annual Conference on Uncertainty in Artificial Intelligence (UAI-08), 2008, pp. 427-434.].
Pearl, J., "Causal Diagrams for Empirical Research (With Discussions)," Technical Report R-218-B, Biometrika, vol. 82, No. 4, 1995, pp. 669-710, printed in Great Britain.
Pearl, J., "Causal Inference in Statistics: An Overview," Technical Report R-350 of Sep. 2009, Statistics Surveys, vol. 3, 2009, pp. 96-146.
Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.
Pearl, J., "Robustness of Causal Claims," Technical Report R-320 of Mar. 2004, Submitted to the 20th Conference on Uncertainty in Artificial Intelligence, Banff, Canada, Jul. 2004, 8 pages. [Can also be found in Proceedings of the 20th Conference on Uncertainty in Artificial Intelligence, AUAI Press, Arlington, VA, Jul. 2004, pp. 446-453.].
Pearl, J., "Simpson's Paradox: An Anatomy," Technical Report R-264, Extracted from Chapter 6 of Causality, Apr. 1999, pp. 1-11.
Pearl, J., "Statistics and Causal Inference: A Review," Test Journal, vol. 12, No. 2, Dec. 2003, pp. 281-345.
Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.
Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.

Zhang, D., et al., "Researches and Application of a Hybrid Fault Diagnosis Expert System," Proceedings of the $3_{rd}$ World Congress on Intelligent Control and Automation, Jun. 28-Jul. 2, 2000, Hefei, P.R. China, pp. 215-219, Copyright 2000 IEEE.

Non-Final Office Action for U.S. Appl. No. 12/251,700 mailed on Jul. 19, 2010; 16 pages.

Non-Final Office Action for U.S. Appl. No. 12/252,056 mailed on Sep. 21, 2010; 17 pages.

Non-Final Office Action for U.S. Appl. No. 12/485,766 mailed on Jan. 25, 2011; 21 pages.

Notice of Allowance for U.S. Appl. No. 12/252,056 mailed on Jan. 6, 2011; 6 pages.

Final Office Action for U.S. Appl. No. 12/251,700 mailed on Dec. 29, 2010; 14 pages.

Non-Final Office Action for U.S. Appl. No. 12/252,128 mailed on Dec. 23, 2010; 19 pages.

Non-Final Office Action for U.S. Appl. No. 12/485,759 mailed on Dec. 21, 2010; 21 pages.

Non-Final Office Action for U.S. Appl. No. 12/251,743 mailed on Dec. 14, 2010; 19 pages.

Non-Final Office Action for U.S. Appl. No. 12/251,661 mailed on Nov. 10, 2010; 20 pages.

Non-Final Office Action for U.S. Appl. No. 12/251,711 mailed on Nov. 9, 2010; 18 pages.

* cited by examiner

GATHERING INFORMATION FOR USE IN DIAGNOSTIC DATA DUMPING UPON FAILURE OCCURRENCE

CROSS-REFERENCES TO RELATED APPLICATIONS

This application claims the benefit and priority under 35 U.S.C. 119(e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with the present application:
(1) U.S. application Ser. No. 12/252,056 entitled DIAGNOSABILITY SYSTEM, filed Oct. 15, 2008, now U.S. Publication No. 2009/0106278, published Apr. 23, 2009;
(2) U.S. application Ser. No. 12/251,648 entitled RULE-BASED ENGINE FOR GATHERING DIAGNOSTIC DATA, filed Oct. 15, 2008, now U.S. Publication No. 2009/0105991, published Apr. 23, 2009;
(3) U.S. application Ser. No. 12/251,731 entitled GATHERING CONTEXT INFORMATION USED FOR ACTIVATION OF CONTEXTUAL DUMPING, filed Oct. 15, 2008, now U.S. Publication No. 2009/0106589, published Apr. 23, 2009;
(4) U.S. application Ser. No. 12/251,743 entitled USER-TRIGGERED DIAGNOSTIC DATA GATHERING, filed Oct. 15, 2008, now U.S. Publication No. 2009/0106596, published Apr. 23, 2009;
(5) U.S. application Ser. No. 12/251,661 entitled DIAGNOSTIC DATA REPOSITORY, filed Oct. 15, 2008 now U.S. Publication No. 2009/0106601, published Apr. 23, 2009;
(6) U.S. application Ser. No. 12/251,667 entitled DIAGNOSABILITY SYSTEM: FLOOD CONTROL, filed Oct. 15, 2008 now U.S. Publication No. 2009/0105982, published Apr. 23, 2009;
(7) U.S. application Ser. No. 12/251,711 entitled NON-INTRUSIVE GATHERING OF DIAGNOSTIC DATA USING ASYNCHRONOUS MECHANISMS, filed Oct. 15, 2008, now U.S. Publication No. 2009/0105989, published Apr. 23, 2000;
(8) U.S. application Ser. No. 12/251,685 entitled SCRUBBING AND EDITING OF DIAGNOSTIC DATA, filed Oct. 15, 2008 now U.S. Publication No. 2009/0106262, published Apr. 23, 2009;
(9) U.S. application Ser. No. 12/251,700 entitled INTELLIGENT COLLECTION OF DIAGNOSTIC DATA FOR COMMUNICATION TO DIAGNOSIS SITE, filed Oct. 15, 2008 now U.S. Publication No. 2009/0106363, published Apr. 23, 2009;
(10) U.S. application Ser. No. 12/252,070 entitled HEALTH METER, filed Oct. 15, 2008 now U.S. Publication No. 2009/0106180, published Apr. 23, 2009;
(11) U.S. application Ser. No. 12/252,128 entitled HEALTH MONITOR, filed Oct. 15, 2008 now U.S. Publication No. 2009/0106605, published Apr. 23, 2009.

BACKGROUND OF THE INVENTION

The present invention relates to system maintenance and diagnosis, and more particularly to techniques for registering information for diagnostic data dumping in a monitored system.

When a system encounters a failure or error, diagnostic data is typically collected and stored to a disk for diagnostic analysis. The diagnostic data may be communicated to a diagnosis site for analysis and resolution of the error. The amount of diagnostic data that is captured varies from one system to another. Using one conventional approach, all of the data associated with the system is gathered and stored to the persistent memory (e.g., a disk) for diagnostic purposes. The stored data is then communicated to a diagnosis site for analysis. Such an approach of complete diagnostic data gathering however consumes a lot of time and valuable system resources. Further, the amount of data that is collected may include thousands of files and many gigabytes of data. Sending such a large volume of data to the diagnosis site is cumbersome, time-consuming, and expensive. Further, if the data received at a diagnosis site is very large, it takes the vendor a long time to analyze the received diagnostic data to identify relevant pieces of data for analyzing a particular problem.

Alternatively, only a basic set of diagnostic data associated with the system is collected and stored during an initial diagnostic process. The diagnostic data gathered by the initial diagnostic process is then analyzed, usually manually, to determine what additional diagnostic processes have to be run to capture additional data that is more relevant to the specific failure and essential for error resolution. This iterative process continues until someone manually determines that sufficient data has been gathered to solve the problem. The second approach thus requires diagnostic data gathering to be performed over multiple stages. At the end of each stage, a manual determination has to be made if sufficient diagnostic data has been gathered. This process is very time-consuming and also very error-prone due to its manual component.

Accordingly, under either scenario, developers at the vendor's diagnosis site cannot locate relevant diagnostic information in a timely manner. As a result, the time needed to resolve the issue or problem is increased, leading to customer dissatisfaction.

BRIEF SUMMARY OF THE INVENTION

Embodiments of the present invention provide techniques for gathering information during runtime of a monitored system such that the information is available for facilitating diagnostics for the monitored system. In one embodiment, upon detection of a condition (such as an error condition) in the monitored system, a portion of the gathered information provides contextual information that facilitates gathering of diagnostic data that is relevant for the detected condition. This facilitates capturing of diagnostic data that is relevant for diagnosing the detected condition. The information gathered and stored during runtime may include information related to local variables, information related to tagged information (e.g., tagged functions or processes) executing in the monitored system, information related to potential impacts to the monitored system due to failures, metadata information, and other information.

According to an embodiment of the present invention, techniques are provided for gathering and storing information for use in diagnostic data dumping in a monitored system. Information related to the monitored system may be gathered during runtime of the monitored system. The gathered information may be stored during runtime of the monitored system. A portion of the stored information may be retrieved in response to a condition detected in the monitored system. The retrieved information may be used for determining one or more diagnostic actions to be performed in response to the detected condition.

In one embodiment, information related to one or more local variables that are used in a function may be gathered and stored during runtime of the monitored system. Information related to the one or more local variables may include an identifier associated with the local variable, a type associated with the local variable, a size of the local variable, a callback function associated with the local variable. In one embodiment, information related to a function or process that is tagged as relevant for diagnosis may be gathered and stored during runtime of the monitored system. In one embodiment, information related to a probable impact related to the detected condition may be gathered and stored during runtime of the monitored system. In one embodiment, information related to metadata information may be gathered and stored during runtime of the monitored system. The metadata information that is gathered may include one or more correlation keys.

In one embodiment, the retrieved information may be dumped to a disk. The retrieved information may be used to determine a diagnostic action to be performed that gathers diagnostic data relevant to the detected condition.

In one embodiment, information may be received identifying the information related to the monitored system to be gathered and stored during runtime of the monitored system. The information may be received during runtime of the monitored system.

The foregoing, together with other features and embodiments will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for gathering information during runtime of a monitored system such that the information is available for facilitating diagnostics for the monitored system. In one embodiment, upon detection of a condition (such as an error condition) in the monitored system, a portion of the gathered information provides contextual information that facilitates gathering of diagnostic data that is relevant for the detected condition. This facilitates capturing of diagnostic data that is relevant for diagnosing the detected condition. The information gathered and stored during runtime may include information related to local variables, information related to tagged information (e.g., tagged functions/processes) executing in the monitored system, information related to potential impacts to the monitored system due to failures, metadata information, and other information.

Figure 1:
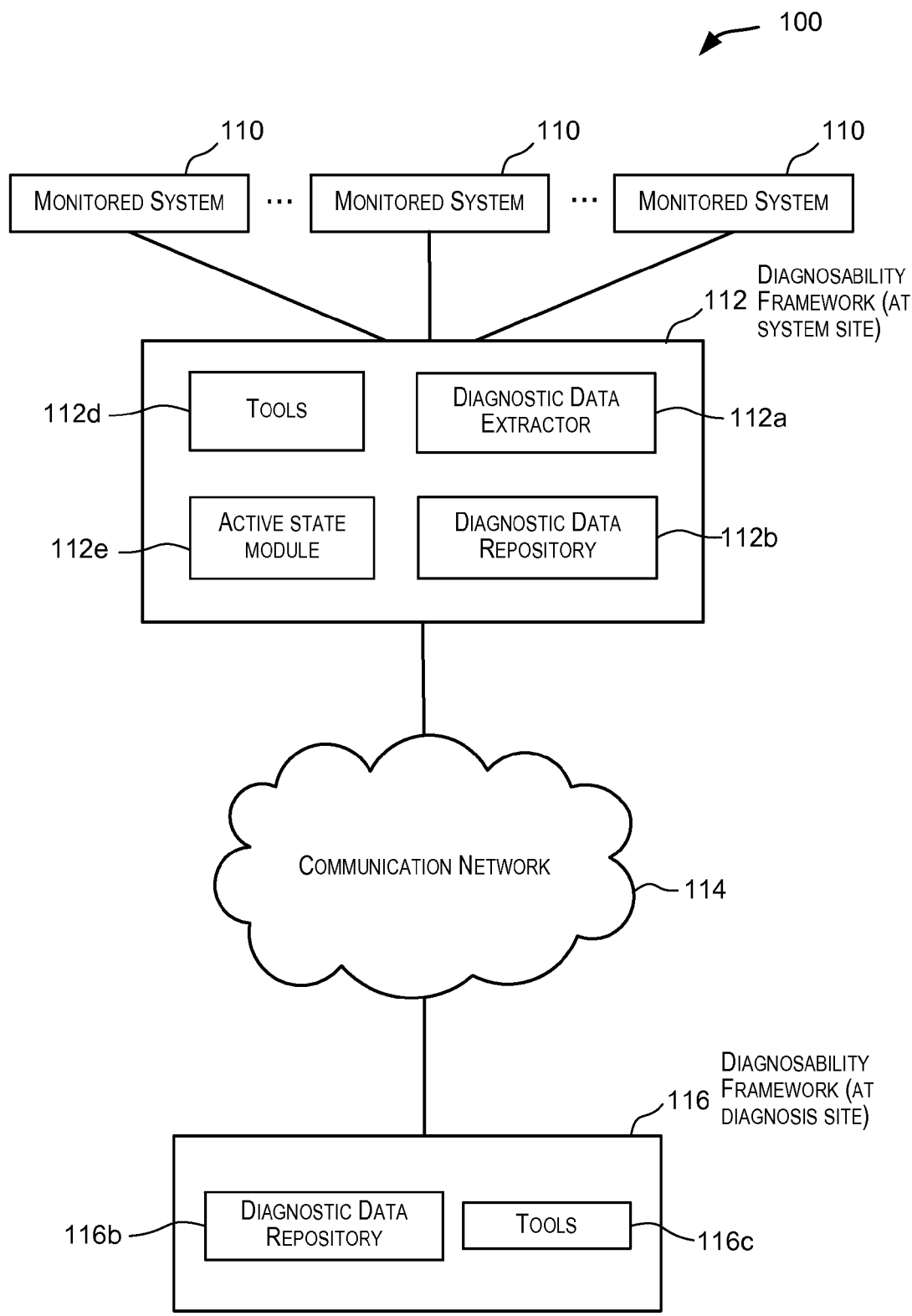
FIG. 1 is a simplified block diagram illustrating a diagnosability system according to an embodiment of the invention.

FIG. 1 is a simplified block diagram of a diagnosability system 100 according to an embodiment of the present invention. Diagnosability system 100 facilitates collection, storage, communication, and analysis of diagnostic data for one or more monitored systems 110 (which may be different products or different instances of the same product). Monitored system 110 may be a software system, a hardware system, an enterprise system, and like. For example, monitored system 110 may be a complex enterprise software system such as a database system and related products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be for example a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store data related to monitored system 110 upon occurrence or detection of a condition in monitored system 110. In one embodiment, the condition detected in the monitored system may be an error condition which triggers gathering and storage of diagnostic data for the error condition. The diagnostic data collected and stored by diagnosability framework 112 may include, for example, trace data, diagnostic dumps, run reports, logs (e.g., error logs), results of diagnosability related actions, and the like. Portions of the diagnostic data stored by diagnosability framework 112 may be communicated to diagnosability framework 116 located at the diagnosis site for analysis, such as failure analysis. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises a diagnostic data extractor (DDE) 112a, a diagnostic data repository (DDR) 112b, an active state module 112e, and various tools 112d. The various components depicted in diagnosability framework 112 are merely examples of components that may be included in diagnosability framework 112. In alternate embodiments, diagnosability framework 112 may have less or more components than those shown. The components in diagnosability framework 112 may be implemented in software (e.g., code, program, instructions that are stored on a machine-readable medium and executed by a processor), hardware, or combinations thereof.

In one embodiment, active state module 112e is configured to gather and store information related to monitored system 110 during runtime. Upon occurrence or detection of a condition in monitored system 110, a portion of the information that is gathered and stored by active state module 112e during runtime is then available and provided as useful contextual data for the detected condition and facilitates gathering of diagnostic data that is relevant to the detected condition. For example, the information that is gathered and stored by active state module 112e may be provided to DDE 112a for determining one or more diagnostic actions to be performed upon occurrence or detection of the condition in system 110 (e.g., actions for gathering diagnostic data relevant to the condition detected in system). In one embodiment, the information gathered and stored by active state module 112e during runtime may be dumped to persistent memory (e.g., disk) upon occurrence or detection of a condition in system 110.

Various different types of information related to monitored system 110 may be gathered and stored by active state module 112e during runtime of monitored system 110. In one embodiment, active state module 112e may gather and store information related to one or more local variables that are used in one or more functions in the call stack. For example, active state module 112e may gather and store pointers to the local variables that are used in a function during runtime of the monitored system. If the pointers to the local variables are still pointing to something valid (i.e., local variables are still active) upon occurrence or detection of a condition in system 110, then the information related to the local variables (pointers to the variables and other information related to the variables) may be dumped to persistent memory or output to other components of diagnosability framework 112 for use in diagnostic data dumping.

In one embodiment, active state module 112e may gather and store information related to information that is explicitly tagged as relevant to diagnosis. The tagged information may be a specific section of system code or a specific function or process executing in the monitored system. The information related to the tagged information may include a name for the tag, a tag identifier of the tag, a tag state (e.g., "active" or "inactive"), and other information related to the tagged information. In one embodiment, a user such as a developer may explicitly tag a specific section of a function or a specific operation in monitored system 110 as relevant for diagnostics during design time. During runtime of system 110, the tag state for a tag may be changed from "inactive" to "active" depending on whether the tagged information is active on the call stack or not. For example, if a specific function is tagged, and if the tagged function is currently active on the call stack, then the tag state associated with the tag is set to "active" and the tag is deemed to be an active tag. On the other hand, if the specific function is not active on the call stack, then the tag state associated with the tag is "inactive" and the tag is deemed to be an inactive tag.

In one embodiment, information related to the tagged information that is tagged by an active tag is provided as useful contextual data for diagnostic data dumping in monitored system 110. For example, upon occurrence of an error, information associated with the active tag (such as tag name, tag identifier, etc.) is provided to DDE 112a for determining one or more diagnostic actions to be performed in response to the detect error condition (e.g., gathering diagnostic data relevant to the detected condition). In this manner, tagging provides a window into what was occurring in the monitored system at and around the time of the error. Tagging also enables a user to specify what specific contextual data may be gathered by active state module 112e and used for diagnostic data dumping upon failure occurrence.

In one embodiment, active state module 112e may gather and store information related to probable impacts that a function or process may have on the monitored system before or during the execution of the function or process by monitored system 110. If the execution of the function or process fails resulting in a condition being detected in monitored system 110, then the impact information that was gathered and stored by active state module 112e is available and provided as useful contextual data for diagnostic data dumping in monitored system 110. In one embodiment, a developer may configure the impact information for one or more functions and processes. For example, a developer may specify a probable impact that a function or process may have on the monitored system if the function or process fails.

The impact information that is gathered and stored by active state module 112e provides specific information about the status of monitored system 110 upon occurrence or detection of a condition in monitored system 110. For example, a memory corruption error related to the dictionary heap may be configured with an impact "dictionary corruption", while a different memory corruption error related to a heap that belongs to row cache may be configured with a different impact such as "row cache corruption". In this manner, the impact information that is gathered and stored by active state module 112e provides the users with more specific information as to which particular memory was corrupted rather than some generic impact information such as "memory corruption". In one embodiment, the impact information that is captured by active state module 112e provides the users with some indications as to what actions may be executed to repair or mitigate the conditions detected in monitored system 110. Active state module 112e and its functions are discussed below in further details.

In one embodiment, DDE 112a is configured to determine one or more actions to be performed in response to conditions detected in system 110. For example, in response to an error condition detected in monitored system 110, DDE 112a may be configured to determine one or more actions to be performed based upon the context data determined for the error condition. The context data determined for a condition may comprise information that is gathered and stored by active state module 112e such as information related to tagged functions or processes, information related to probable impacts that a function or process may have on the monitored system if the function or process fails, and other information. The actions determined by DDE 112a may include actions for gathering diagnostic data that is relevant for the detected condition.

In one embodiment, DDE 112a is a rule-based engine. One or more DDE rules may be configured for and provided to DDE 112a. A DDE rule may identify a DDE condition and one or more diagnostic actions (also referred to as DDE actions) to be performed when the DDE condition is met. The DDE condition specified in a DDE rule may comprise information related to one or more conditions detected in monitored system 110 (such as error number and error arguments), information that is gathered and stored by active state module 112e. For example, a DDE rule may be specified based on information associated with an active tag such as Active_Tag (transaction_rollback). The diagnostic actions specified in a DDE rule may include determining and gathering diagnostic data that is deemed to be relevant to the conditions detected in monitored system 110, recommending one or more actions to be performed (possibly for additional diagnostic data gathering or for minimizing the impact of the error), invoking health checks (for gathering monitored system-related information for determining the health of the monitored system), and the like. DDE rules may be user-configurable.

In one embodiment, only diagnostic data that is deemed to be relevant for diagnosis of a detected condition is gathered and stored (dumped to disk). The contextual data provided by active state module 112e coupled with the use of the DDE 112a rules-based engine enables diagnosability framework 112 to intelligently gather and store relevant diagnostic data that is useful for resolution of the condition that triggered the diagnostic data dumping. The DDE rules may be configured such that the right level of detail is collected and stored for a detected condition. Once the DDE rules have been evaluated, the actions to be performed for gathering diagnostic data that is relevant for the detected condition are automatically determined without requiring any human intervention. The actions may also be executed automatically without requiring any human intervention. Further information related to DDE 112a and its functions may be found in the applications incorporated by reference in the present application.

Diagnostic data repository (DDR) 112b (also sometimes referred to as ADR in the applications incorporated by reference in the present application) provides a centralized repository for storing diagnostic data related to monitored system 110 collected by diagnosability framework 112. The data may be stored in a structured format that enables searching and database-like querying capabilities. In one embodiment, DDR 112b is a file-based repository. Various different types of diagnostic data may be stored in diagnostic data repository 112b such as traces, dumps, alert logs, health monitor reports, and the like. Information gathered by active state module 112e (e.g., such as information related to one or more local variables for a particular function on the call stack) may be stored or dumped in DDR 112b.

In one embodiment, DDR 112b is capable of storing diagnostic data for multiple monitored systems (which may be different products or different instances of the same product). The diagnostic data for each monitored system may be stored under a separate directory (e.g., an ADR_HOME directory) allocated to that system. The ADR_HOME directories share a common structure to facilitate analysis of the stored data across multiple monitored systems. Multiple ADR_HOME directories may be present under a single ADR_BASE directory. In this manner, diagnostic data for multiple monitored systems may be stored and organized in a consistent manner.

In one embodiment, the data stored in DDR 112b may be tagged or annotated with metadata information. The metadata information may be used to find correlations between pieces of the data stored in DDR 112b. The metadata also enables navigation of the data stored in DDR 112b. The metadata may include one or more correlation keys. Further information related to DDR 112b and correlation keys may be found in the applications incorporated by reference in the present application.

Various tools 112d may be provided as part of diagnosability framework 112. These tools may include tools for querying the diagnostic data or information stored in DDR 112b, tools for generating reports, analysis tools, and other tools that may use information collected and stored by diagnosability framework 112. Further information regarding tools 112d can be found in the applications incorporated by reference in the present application.

As mentioned previously, the diagnostics data collected by diagnosability framework 112 may also be forwarded to diagnosability framework 116 located at a remote site (for example, the site of a software system vendor) for analysis. As depicted in FIG. 1, diagnosability framework 116 may comprise a diagnostic data repository 116b, and one or more tools 116c. The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 16 may be implemented in software, hardware, or combinations thereof.

In one embodiment, diagnostic data repository 116b provides a repository for storing diagnostic data received from one or more system sites. In one embodiment, the structure of diagnostic data repository 116b is the same as the structure of diagnostic data repository 112b at system sites. This facilitates efficient storage and analysis of the data. In such an embodiment, data received from system site packages is stored in the same directory location in diagnostic data repository 116b as the data that was stored in diagnostic data repository 112b.

Various tools 116c may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

The present application focuses on active state module 112e of diagnosability framework 112. Information related to the various other components of diagnosability system 100 may be found in the applications incorporated by reference in the present application.

Figure 2:
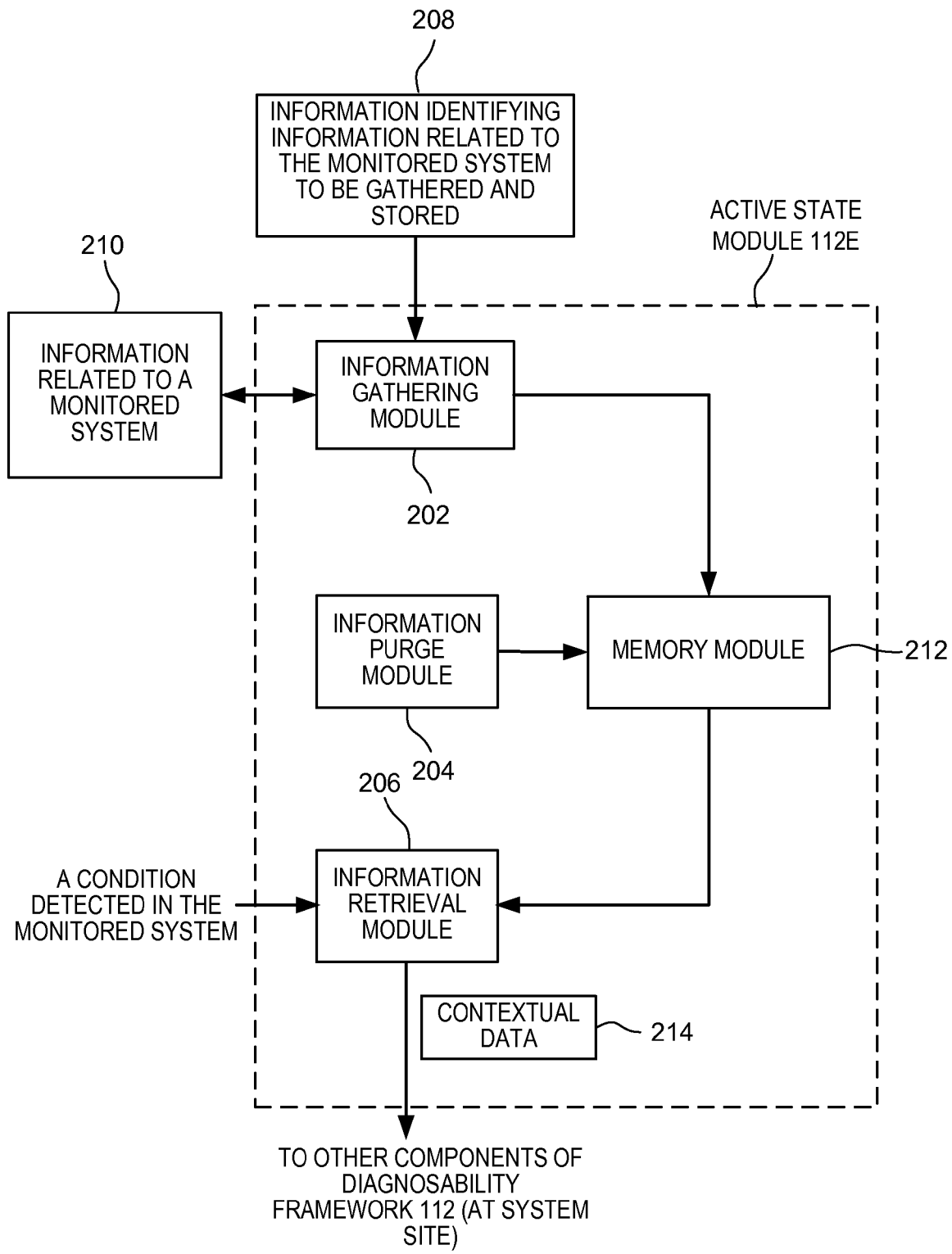
FIG. 2 is a simplified block diagram depicting an active state module 112e according to an embodiment of the invention.

FIG. 2 is a simplified block diagram depicting active state module 112e according to an embodiment of the present invention. The various components depicted in active state module 112e are merely examples of components that may be included in active state module 112e. In alternate embodiments, active state module 112e may have less or more components than those shown in FIG. 2. The components depicted in FIG. 2 may be implemented in software (e.g., code, program, instructions that are stored in a machine-readable medium and executed by a processor), hardware, or combinations thereof.

As mentioned previously, active state module 112e is configured to gather and store information related to monitored system 110 during runtime of the monitored system. Upon occurrence or detection of a condition in monitored system 110, a portion of the information gathered and stored by active state module 112e during runtime is then available and used as useful contextual data for diagnostic data dumping in monitored system 110. For example, the information gathered and stored by active state module 112e may be provided to DDE 112a for determining one or more diagnostic actions to be performed upon occurrence or detection of one or more conditions in system 110 (e.g., gathering diagnostic data relevant to the conditions detected in system). In one embodiment, the information that is gathered and stored by active state module 112e during runtime may be dumped to persistent memory (e.g., disk) upon occurrence or detection of a condition in system 110.

As depicted in FIG. 2, information gathering module 202 is configured to gather a portion of information 210 related to monitored system 110 during runtime of the monitored system. Upon detection of a condition, the portion of information 210 that is gathered by information gathering module 202 may be used as useful contextual information for diagnostic data dumping responsive to the detected condition. As depicted in FIG. 2, information 208 may be provided to information gathering module 202 identifying the information to be gathered by information gathering module 202 during runtime of monitored system 110. Information 208 may identify information related to one or more local variables to be gathered, information related to one or more tagged functions or processes to be gathered, information related to probable impacts for one or more functions or processes on the monitored system to be gathered, metadata information related to the monitored system to be gathered, and other information that is to be gathered by information gathering module 202. A set of application programming interfaces (APIs) may be provided to invoke gathering and storing of information related to the monitored system during runtime.

Information 208 may be provided by a user of diagnosability framework 112. For example, a developer may identify one or more local variables of a particular function for which information is to be gathered and stored during runtime of monitored system 110 such that the gathered information is available for facilitating diagnostic data dumping upon occurrence or detection of a condition in system 110. As another example, a developer of monitored system 110 may tag a specific section of the system code or a specific operation as relevant for diagnosis during design time for which information is to be gathered and stored during runtime of monitored system 110. Information 208 may also be provided by other components of diagnosability framework 112.

In one embodiment, the information that is gathered by information gathering module 202 during runtime of monitored system 110 may be user configurable prior to or during runtime of the monitored system. A user interface (e.g., a GUI, a command line interface) may be provided that enables the user developer or other user (e.g., customer of a product being monitored) to browse through functions and processes to be executed or that are being executed by monitored system 110 and identify information to be gathered related to the functions and processes. For example, the user may select one or more local variables of a particular function for which the information is to be gathered by information gathering module 202.

Upon receiving information 208, information gathering module 202 is configured to automatically gather information as identified in information 208. For example, if information 208 identifies information related to a local variable of a function to be gathered, information gathering module 202 automatically gathers the information related to the local variable upon receiving information 208. The information related to a local variable that is gathered by information gathering module 202 may include for example a pointer to the variable, a value of the variable, a key (e.g. <function name>_<variable name>) that identifies the variable, size of the variable to be gathered, metadata related to the variable, and other information related to the variable. In one embodiment, the information related to a local variable that is gathered by information gathering module 202 may include one or more attributes associated with the local variable. In one embodiment, the attributes may include the following information:

Identifier (ID): The ID may be a string that is used to identify a specific class that the variable belongs to. For example, a variable may belong to a class database_header.

Type: This attribute specifies the variable type (e.g., integer, character, pointer to an integer). The type attribute may be used to search for variables of a specific type.

Size (optional): This attribute specifies the size of the variable. The size may be static (like in the case of a C structure or a primitive) or dynamic (like in the case of arrays).

Callback function (optional): This callback function may be called when the information that was gathered and stored for a variable is to be dumped to persistent memory upon occurrence or detection of a condition in monitored system. For example, the callback function may be a formatting function that defines the default format for the variable when the information that was gathered and stored for the variable is dumped to persistent memory upon occurrence or detection of a condition in monitored system 110.

If information 208 identifies information related to a tagged function or process to be gathered, information gathering module 202 automatically gathers information related to the tagged function or process. Information related to a tagged function or process that is gathered by information gathering module 202 may include a tag name (e.g., a text string), a tag identifier (tag ID), a tag state, and other information related to the tagged function or process. The tag state associated with the tag may be set to "active" by information gathering module 202 if the tagged function or process is currently executed by monitored system 110 (such a tag is sometimes referred to as an active tag). In one embodiment, a default state "inactive" may be specified for the tag state associated with the tag indicating the function or process is not currently executed by monitored system 110 (such a tag is sometimes referred to as an inactive tag).

If information 208 identifies information related to probable impacts associated with a specific function or process on the monitored system to be gathered and stored during runtime of the monitored system, information gathering module 202 automatically gathers the impact information related to the function or process before or during execution of the function or process. For example, for a database system, information 208 may identify a particular function or process for which impact information is to be gathered before or during execution of the function or process. Upon receiving information 208, information gathering module 202 may derive the impact information from an external file (e.g., table) that maps the impact information to the function or process. In this embodiment, given a function or process that is executed in monitored system 110, information gathering module 202 may use the external file to map the function or process to the corresponding impact information. The impact information gathered by information gathering module 202 for a particular function or process may include an error number and error arguments associated with a condition that is caused by the failure of the function or process, an impact name, and other information related to the probable impacts.

In one embodiment, information 208 may identify that metadata information related to the monitored system is to be gathered during runtime. Information gathering module 202 then automatically gathers the specified metadata during runtime of monitored system 110. For example, one or more health monitor (HM) checks may be performed for monitored system 110 to determine information related to system 110. For example, a health check may be configured to gather information related to various aspects of system 110 including information related to one or more layers/components in system 110. In one embodiment, a health check is a piece of code that is executed by a processor and the execution of which results in information related to system 110 being determined and/or gathered for diagnostic purposes. Before a health monitor check is performed in monitored system 110, a developer may request information such as health check run identifier (HEALTH_CHECK_RUN_ID) to be gathered and stored by active state module 112e. The metadata information that is gathered by information gathering module 202 may be used, among other things, for correlating different pieces of diagnostic data dumped for system 110.

The metadata information that is gathered by information gathering module 202 may include one or more correlation keys comprising one or more (key, value) pairs. For example, the correlation keys may include "SESSION_ID", "PROCESS_ID", "EXECUTION_CONTEXT_ID", "HEALTH_CHECK_RUN_ID", and the like keys and their associated values. The correlation keys may be used for finding correlations between pieces of diagnostic data gathered and stored in DDR 112b.

The portion of information 210 that is gathered by information gathering module 202 may be stored in memory 212, which may be a combination of RAM memory and persistent disk memory. In one embodiment, the information that is gathered by information gathering module 202 is stored in a stack in RAM in memory 212. For example, during runtime, the information gathered by information gathering module 202 may be pushed onto the stack. Upon occurrence or detection of a condition in monitored system 110, a portion of the information stored in the stack in memory 212 may be popped from the stack by information retrieval module 206 and dumped to disk. For example, by default, if variable V1 of function foo( ) is pushed before variable V2 is pushed onto the stack, then variable V2 would be popped before variable V1 is popped. The information gathered by information gathering module 202 may also be stored in other forms.

In one embodiment, information purge module 204 is configured to automatically remove or discard a portion of the information that is stored in memory 212 under certain situations. For example, one or more local variables for a function may be gathered and stored before the function calls another function, and if the called function successfully returns to the calling function at a later time, then the local variables that were previously stored for the calling function before calling the called function may be discarded and removed from memory 212. In this manner, the amount of the information that is stored in memory 212 is controlled to prevent memory overflow.

As another example, information related to a tagged operation or function such as a "Parsing_SQL" operation may be gathered and stored by active state module 112e at or about the time that the tagged function or operation is executed. After the tagged function has been successfully executed, the information related to the tagged operation may be removed or discarded from memory 212. In one embodiment, instead of discarding information related to the tagged function or operation that is no longer active on the call stack, the tag state associated with the tag may be set to "inactive." In one embodiment, information about inactive tags is not provided to other components of diagnosability framework such as DDE 112a.

In another example, information related to probable impacts of a particular function or operation that is stored in memory 212 may be removed or discarded after the function or operation has successfully completed execution. In one embodiment, user can also specifically identify information stored in memory 212 that is to be discarded. For example, the information stored in memory 212 may be presented to the user for review. The user may then determine or specify which information is to be removed or discarded from memory 212.

In this manner, the information stored in memory 212 is dynamic and may change over time. Information that is not longer relevant is discarded making room for newer more relevant information. This ensures that memory 212 always stores information that is useful for diagnostic data dumping. The size of memory 212 may be kept small for fast retrieval of information. For example, the number of local variables that are stored in memory 212 may be limited to a preconfigured number (e.g., less than 200 variables). This enables active state module 112e to efficiently and effectively gather, store, and retrieve interesting information to facilitate diagnostic data dumping in system 110 upon failure occurrence.

Information retrieval module 206 is configured to retrieve information that is stored in memory 212 and provide the retrieved information to other components of diagnosability framework 112 in response to a condition detected in monitored system 110. For example, as depicted in FIG. 2, information retrieval module 206 may receive information identifying a condition detected in monitored system 110. In response, information retrieval module 206 retrieves all or a portion of information from memory 212 that is relevant to and provides a context for the detected condition. For example, information related to one or more local variables of a function may be gathered and stored in memory 212 during execution of a function and before the function calls another function. If the called function fails (which triggers a condition in system 110), the information related to one or more local variables stored in memory 212 may be determined by information retrieval module 206 as being relevant to the detected condition and retrieved from memory 212. In one embodiment, the information related to one or more local variables may be dumped to DDR 112b for diagnosis at diagnosis site 116.

As another example, information related to a tagged operation or function executing by monitored system 110 may be gathered and stored in memory 212. If the execution of the tagged operation or function fails resulting in a condition being detected in system 110, then the information related to the tagged operation or function that is stored in memory 212 may be retrieved by information retrieval module 206 from memory 212. In one embodiment, the information related to the tagged operation or function that is retrieved may be provided to DDE 112a for determining one or more diagnostic actions to be performed in system 110.

As described above, upon receiving information identifying a detected condition, information retrieval module 206 is configured to retrieve information from memory 212 that is relevant to the detected condition. Information may be considered relevant to a detected condition if it facilitates gathering of diagnostic data that is relevant for diagnosis of the detected condition. Various different criteria may be used to determine whether a certain piece of information stored in memory 212 is relevant to a detected condition, including, time when the condition was detected and a time when the information was stored in memory 212, the failing function or process which caused the detected condition, information related to active/inactive tags, etc.

Figure 3:
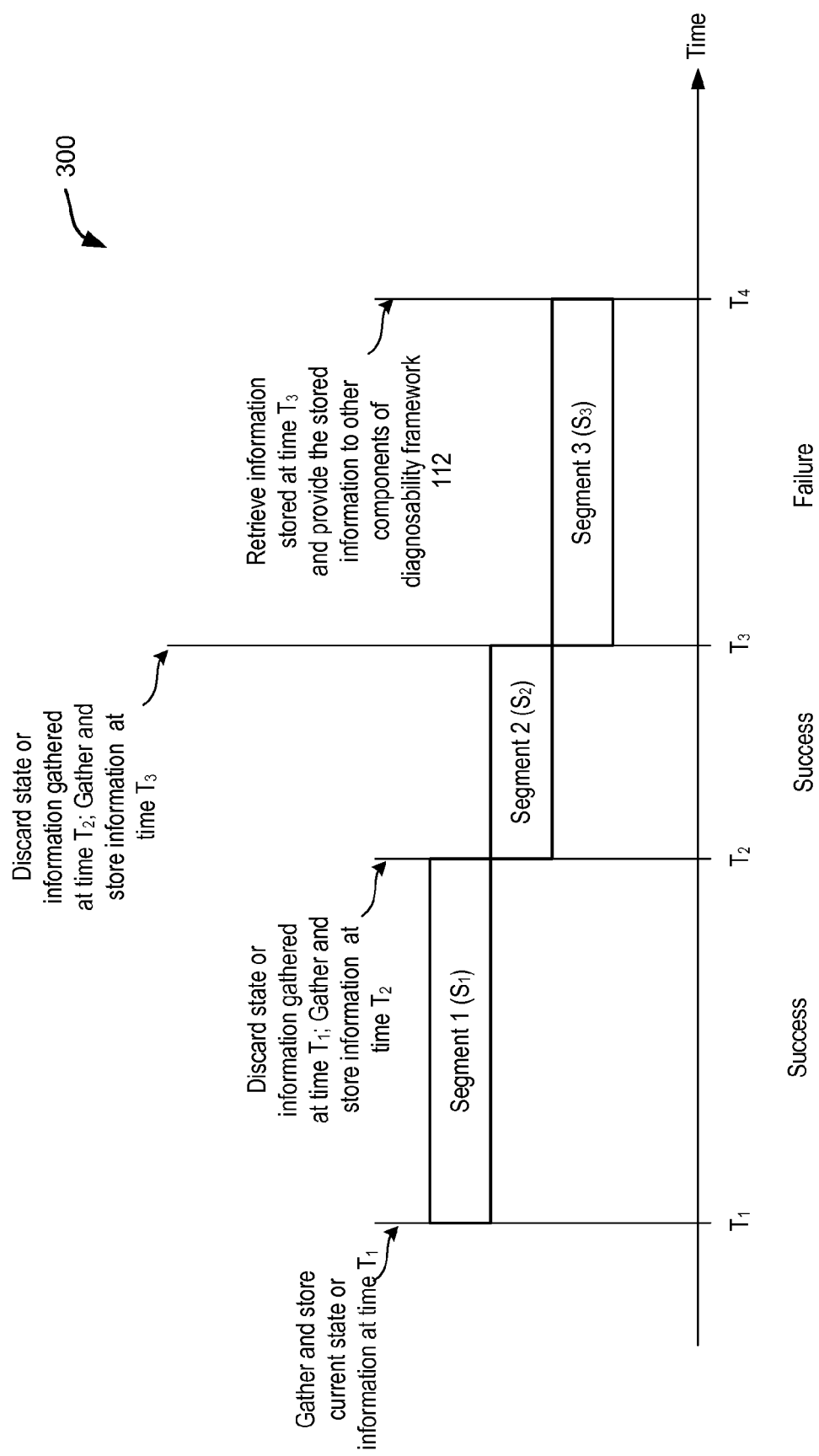
FIG. 3 is a timing diagram depicting when information related to a monitored system is gathered, stored, and retrieved according to an embodiment of the present invention.

FIG. 3 is a timing diagram 300 depicting when information is gathered, stored, and retrieved by active state module 112e according to an embodiment of the present invention. The processing depicted in FIG. 3 may be performed by software (executed by a processor), hardware, or combinations thereof. For the example depicted in FIG. 3, it is assumed that the main code path of monitored system 110 may be divided into one or more segments, each segment representing a portion of the main code path that is to be executed by monitored system during runtime. For example, a segment may represent a particular function or operation to be executed by monitored system 110 at any particular instant of time.

As depicted in FIG. 3, at time $T_1$, before segment 1 ($S_1$) is about to be executed by the monitored system, the current state or information related to the monitored system 110 is gathered and stored. The current state or information gathered and stored at $T_1$ may include information related to one or more local variables of a calling function that calls $S_1$, information related to the tagged segment $S_1$ (assume that $S_1$ is tagged), impact information related to $S_1$, and the like. Subsequently at time $T_2$ after $S_1$ has successfully completed execution, information that was gathered and stored at time $T_1$ may then be discarded.

At time $T_2$, before segment 2 ($S_2$) is about to be executed by monitored system, the current state or information related to the monitored system 110 is gathered and stored. The current state or information gathered and stored at $T_2$ may include information related to one or more local variables of a calling function that calls $S_2$, information related to the tagged segment $S_2$ (assume that $S_2$ is tagged), impact information related to $S_2$, and the like. Subsequently at time $T_3$ after $S_2$ has successfully completed execution, information that was gathered and stored at time $T_2$ may then be discarded.

At time $T_3$, before segment 3 ($S_3$) is about to be executed by monitored system, the current state or information related to the monitored system 110 is gathered and stored. The current state or information gathered and stored at $T_3$ may include information related to one or more local variables of a calling function that calls $S_3$, information related to the tagged segment $S_3$ (assume that $S_2$ is tagged), impact information related to $S_3$, and the like. However, at time $T_4$, $S_3$ fails during execution. The failure of $S_3$ may cause an error condition to be detected in system 110. In response to the detected error condition, at time $T_4$, the information that was gathered and stored at time $T_3$ may be retrieved and provided to other components of diagnosability framework 112 for use in diagnostic data dumping for the detected error condition.

Figure 4:
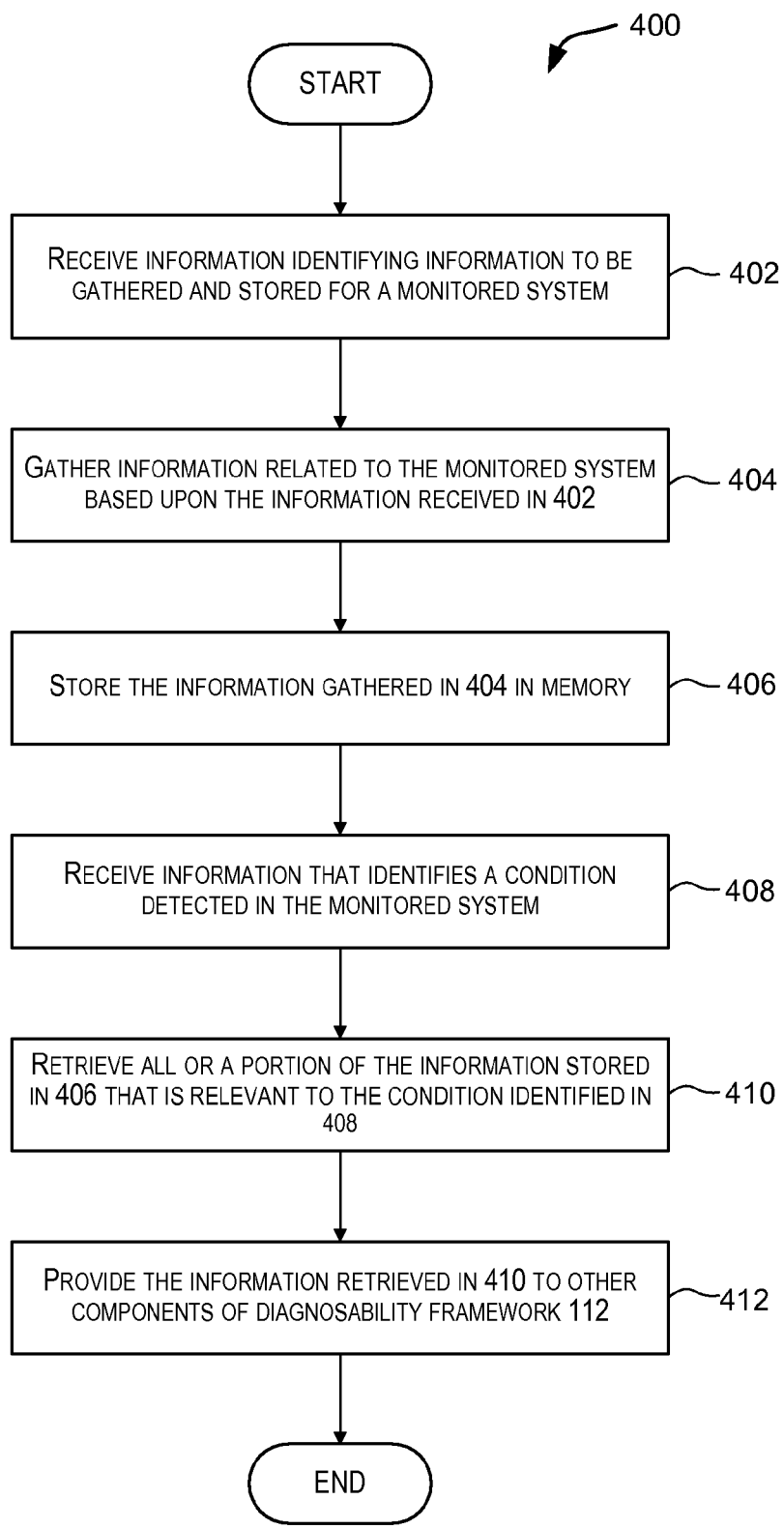
FIG. 4 is a simplified flow diagram illustrating a method for registering information related to a monitored system according to an embodiment of the present invention.

FIG. 4 is a simplified flow diagram illustrating a method for collecting and storing information during runtime of a monitored system according to an embodiment of the present invention. The processing depicted in FIG. 4 may be performed by software (executed by a processor), hardware, or combinations thereof. In one embodiment, the method may be performed by active state module 112*e* depicted in FIG. 1.

Referring to FIG. 4, at 402, information is received identifying information related to the monitored system that is to be gathered and stored during runtime and made available for purposes of diagnostic data dumping upon failure occurrence. The information received in 402 may be provided by a user of the monitored system, a developer, or may even be received from some component of diagnosability framework 112. A set of application programming interfaces (APIs) may be provided to specify the information to be gathered. Information identifying the information to be gathered may be received prior to runtime of the monitored system or even during runtime of the monitored system.

In one embodiment, a user interface is provided that enables a user (developer) to specify what particular information related to the monitored system is to be gathered and stored during runtime. For example, the user interface enables the user to browse a list of functions and/or processes related to the monitored system and allows the user to select one or more local variables of a particular function to be gathered and stored, allows the user to tag functions for which information is to be gathered, and the like. The user may provide information via the interface such as the name of the function, the variable class that the particular variable belongs to, the variable type and size, and other information related to the variable.

At 404, based upon the information received in 402, information related to the monitored system may be gathered during runtime. For example, information related to a local variable of a function being executed in the monitored system may be gathered. The information related to a local variable that is gathered during runtime of the monitored system may include a pointer to the local variable, a value of the local variable, a key that identifies the local variable (e.g. <function name>_<variable name>), size of the local variable to be gathered, metadata related to the variable, one or more attributes related to the local variable, and other information related to the variable. Other types of information may also be gathered at runtime such as information related a tagged function or process, impact information related to a function or process, metadata information, etc.

At 406, the information gathered in 404 is stored. Various means may be used to store the information gathered in 404. In one embodiment, the information gathered in 404 is stored in a stack in a RAM memory for fast retrieval. In this embodiment, the information is pushed onto the stack and popped from the stack upon retrieval. Alternatively, the information gathered in 404 may be stored in some other memory structure (e.g., a list).

At 408, information is received identifying a condition detected in monitored system 110. In one embodiment, information received in 408 identifies an error condition in system 110.

At 410, all or a portion of the information stored in 406 that is relevant to the condition identified in 408 is retrieved. For example, information related to one or more local variables of a calling function may be retrieved if the called function fails (which triggers a condition to be detected in system 110). As another example, information related to a tagged function may be retrieved if the tagged function or operation fails to be executed resulting in an error condition being detected in system 110. The information stored in 406 may be retrieved by information retrieval module 206.

As previously describes, information stored in 406 may be considered relevant to a detected condition if it facilitates gathering of diagnostic data that is relevant for diagnosis of the detected condition. Various different conditions may be used to determine whether a certain piece of information stored in 406 is relevant to the condition identified in 408, including, time when the condition was detected and a time when the information was stored, the failing function or process which caused the detected condition, information related to active/inactive tags, etc.

At 412, the information retrieved in 410 is provided to other components of diagnosability framework 112 for analysis. In one embodiment, the retrieved information facilitates gathering of relevant diagnostic data for the condition identified in 408. For example, the information related to the tagged function that may be retrieved in 410 may be provided to DDE 112*a* for determining one or more diagnostic actions to be performed in system 110. As another example, the information related to one or more local variables that may be retrieved in 410 may be dumped to DDR 112*b* for diagnosis at diagnosis site 116.

Figure 5:
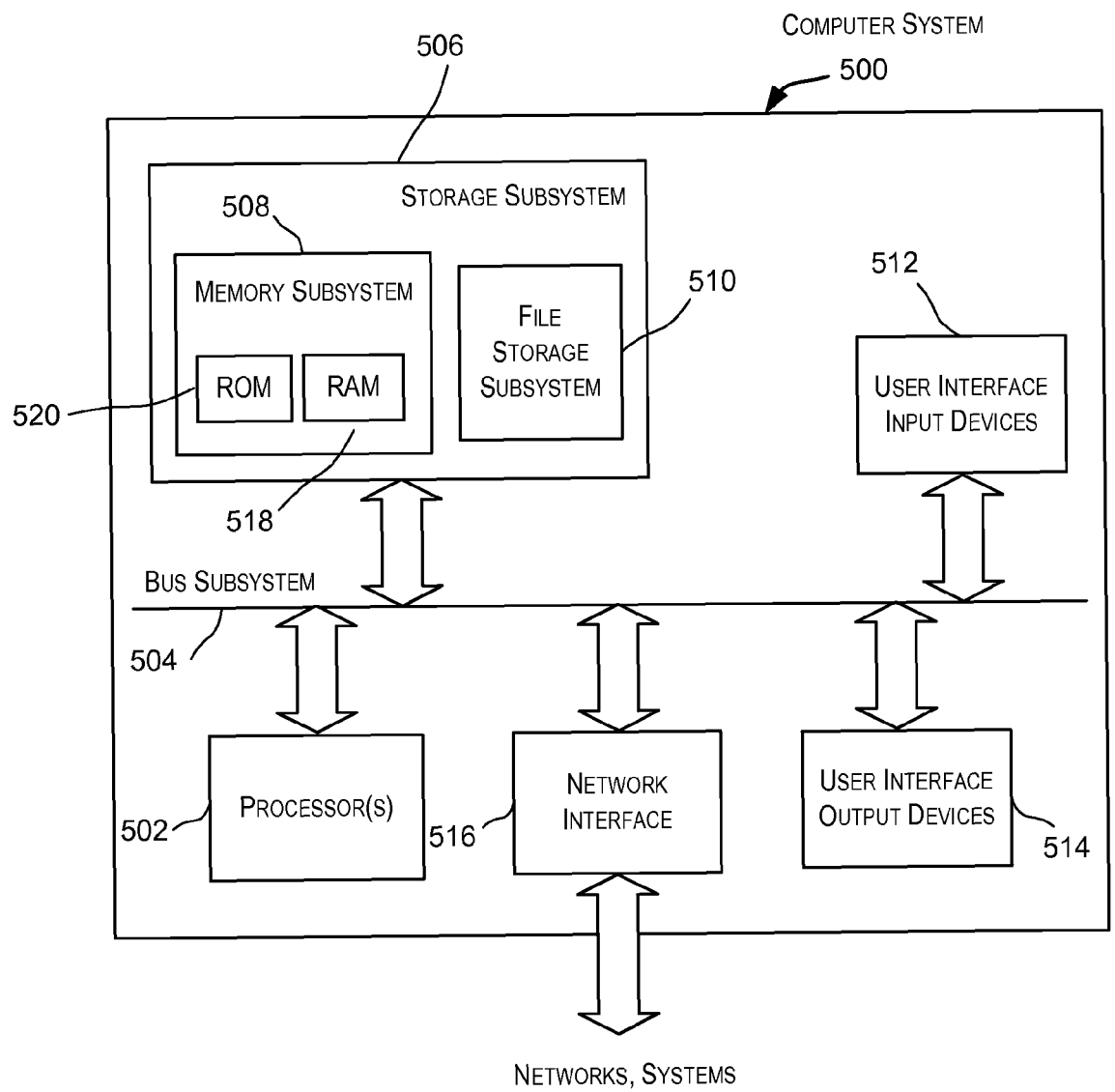
FIG. 5 is a simplified block diagram of a computer system that may be used to practice an embodiment of the various inventions described in this application.

FIG. 5 is a simplified block diagram of a computer system 500 that may be used to practice an embodiment of the present invention. A computer system 500 at a monitored system site may serve as the platform for diagnosability framework 112 depicted in FIG. 1. Another computer system 500 located at a diagnosis site may serve as a platform for diagnosability framework 116. Computer systems at a diagnosis site and at a system site may have same or different operating platforms. A diagnosability framework, such as diagnosability framework 112, may also be distributed across multiple computer systems.

As shown in FIG. 5, computer system 500 includes a processor 502 that communicates with a number of peripheral subsystems via a bus subsystem 504. These peripheral subsystems may include a storage subsystem 506, comprising a memory subsystem 508 and a file storage subsystem 510, user interface input devices 512, user interface output devices 514, and a network interface subsystem 516.

Bus subsystem 504 provides a mechanism for letting the various components and subsystems of computer system 500 communicate with each other as intended. Although bus subsystem 504 is shown schematically as a single bus, alternative embodiments of the bus subsystem may utilize multiple busses.

Network interface subsystem 516 provides an interface to other computer systems, networks, and portals. Network interface subsystem 516 serves as an interface for receiving data from and transmitting data to other systems from computer system 500. For example, for the diagnosability framework deployed at the customer site or site where the software system is deployed, network interface subsystem 516 may be configured to transfer diagnostic packages from the customer site to the vendor or diagnosis site.

User interface input devices 512 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 500.

User interface output devices 514 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 provides a computer-readable medium for storing the basic programming and data constructs that provide the functionality of the present invention. Software (code modules or instructions) that provides the functionality of the present invention may be stored in storage subsystem 506. These software modules or instructions may be executed by processor(s) 502. Storage subsystem 506 may also provide a repository for storing data used in accordance with the present invention such as the diagnostic data repository. Storage subsystem 506 may comprise memory subsystem 508 and file/disk storage subsystem 510.

Memory subsystem 508 may include a number of memories including a main random access memory (RAM) 518 for storage of instructions and data during program execution and a read only memory (ROM) 520 in which fixed instructions are stored. File storage subsystem 510 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 500 can be of various types including a personal computer, a portable computer, a workstation, a network computer, a mainframe, a kiosk, a server or any other data processing system. Due to the ever-changing nature of computers and networks, the description of computer system 500 depicted in FIG. 5 is intended only as a specific example for purposes of illustrating the preferred embodiment of the computer system. Many other configurations having more or fewer components than the system depicted in FIG. 5 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for gathering and storing information for use in diagnostic data dumping in a monitored system, comprising:
    gathering information related to the monitored system during runtime of the monitored system;
    storing the gathered information during runtime of the monitored system; and
    identifying, in response to a detected condition, a portion of the stored information that is relevant to the detected condition in the monitored system;
    wherein the portion of the stored information is used for determining one or more diagnostic actions to be performed in response to the detected condition.

2. The method of claim 1 wherein gathering the information related to the monitored system during runtime comprises gathering information related to one or more local variables used in a function that is executed by the monitored system, and wherein a failure of the function causes the detected condition.

3. The method of claim 2 wherein gathering the information related to one or more local variables comprises gathering one or more attributes associated with the local variable.

4. The method of claim 3 wherein gathering one or more attributes associated with the local variable comprises gathering an identifier associated with the local variable, a type associated with the local variable, a size of the local variable, a callback function associated with the local variable, or combinations thereof.

5. The method of claim 1 wherein gathering the information related to the monitored system comprises gathering information related to a function or process that is tagged as relevant for diagnosis.

6. The method of claim 1 wherein gathering the information related to the monitored system comprises gathering information related to a probable impact related to the condition detected in the monitored system.

7. The method of claim 1 wherein gathering the information related to the monitored system comprises gathering metadata information, the metadata information comprising one or more correlation keys.

8. The method of claim 1 wherein storing the gathered information during runtime comprises pushing the gathered information into a stack.

9. The method of claim 1 further comprising dumping the retrieved information to a disk.

10. The method of claim 1 wherein the retrieved information is used for determining a diagnostic action to be performed that gathers diagnostic data relevant for the detected condition.

11. The method of claim 1 further comprising receiving information identifying information related to the monitored system to be gathered and stored during runtime of the monitored system, and the information identifying information to be gathered and stored during runtime is received during runtime of the monitored system.

12. A computer readable storage medium storing a plurality of instructions for controlling a processor to gather and store information for use in diagnostic data dumping in a monitored system, the plurality of instructions comprising:

instructions that cause the processor to gather information related to the monitored system during runtime of the monitored system;

instructions that cause the processor to store the gathered information during runtime of the monitored system;

instructions that cause the processor to identify, in response to a detected condition, a portion of the stored information that is relevant to the detected condition in the monitored system; and instructions that cause the processor to use the portion of the stored information for determining one or more diagnostic actions to be performed in response to the detected condition.

13. The computer readable storage medium of claim 12 wherein the instructions that cause the processor to gather information related to the monitored system during runtime of the monitored system comprise instructions that cause the processor to gather information related to one or more local variables used in a function that is executed by the monitored system, and wherein a failure of the function causes the detected condition.

14. The computer readable storage medium of claim 13 wherein the instructions that cause the processor to gather the information related to one or more local variables comprise instructions that cause the processor to gather one or more attributes associated with the local variable.

15. The computer readable storage medium of claim 14 wherein the instructions that cause the processor to gather one or more attributes associated with the local variable comprise instructions that cause the processor to gather an identifier associated with the local variable, a type associated with the local variable, a size of the local variable, a callback function associated with the local variable, or combinations thereof.

16. The computer readable storage medium of claim 12 wherein the instructions that cause the processor to gather information related to the monitored system during runtime of the monitored system comprise instructions that cause the processor to gather information related to a function or process that is tagged as relevant for diagnosis.

17. The computer readable storage medium of claim 12 wherein the instructions that cause the processor to gather information related to the monitored system during runtime of the monitored system comprise instructions that cause the processor to gather information related to a probable impact related to the condition detected in the monitored system.

18. The computer readable storage medium of claim 12 wherein the instructions that cause the processor to gather information related to the monitored system during runtime of the monitored system comprise instructions that cause the processor to gather metadata information, the metadata information including one or more correlation keys.

19. A system for gathering and storing information for use in diagnostic data dumping in a monitored system, the system comprising:

a memory; and a processor coupled to the memory;

wherein the processor is configured to:

gather information related to the monitored system during runtime of the monitored system;

store the gathered information during runtime of the monitored system;

identify, in response to a detected condition, a portion of the stored information that is relevant to the detected condition in the monitored system; and wherein the portion of the stored information is used for determining one or more diagnostic actions to be performed in response to the detected condition.

20. The method of claim 1 wherein identifying the portion of the stored information is based upon a time when the condition was detected and a time when the information was stored in memory.

* * * * *

UNITED STATES PATENT AND TRADEMARK OFFICE
CERTIFICATE OF CORRECTION

| | |
|---|---|
| PATENT NO. | : 7,941,707 B2 |
| APPLICATION NO. | : 12/251671 |
| DATED | : May 10, 2011 |
| INVENTOR(S) | : Sarig et al. |

It is certified that error appears in the above-identified patent and that said Letters Patent is hereby corrected as shown below:

Title page 3, in column 1, under "Other Publications", line 15, delete "$3_{rd}$" and insert -- $3^{rd}$ --, therefor.

In column 1, line 45, delete "2000;" and insert -- 2009; --, therefor.

In column 13, line 24, delete "$S_2$" and insert -- $S_3$ --, therefor.

Signed and Sealed this
Eleventh Day of October, 2011

David J. Kappos
*Director of the United States Patent and Trademark Office*